UNITED STATES PATENT OFFICE.

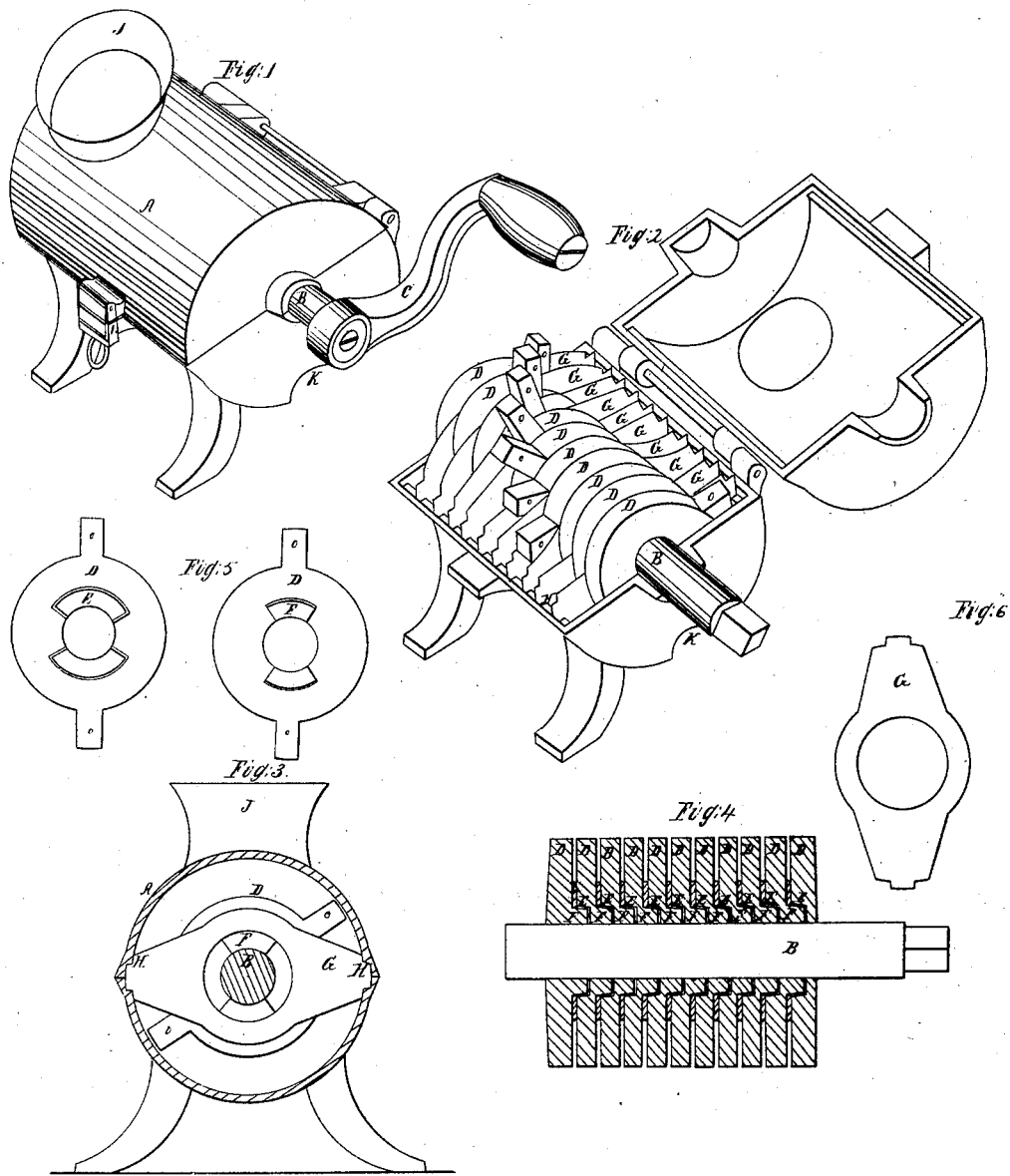

JOHN G. PERRY, OF KINGSTON, RHODE ISLAND.

IMPROVED MEAT-CUTTER.

Specification forming part of Letters Patent No. 23,262, dated March 15, 1859.

*To all whom it may concern:*

Be it known that I, JOHN G. PERRY, of Kingston, in the county of Washington, in the State of Rhode Island, have invented a new and useful Improvement in Machines for Cutting Meat; and I do hereby declare that the following is a full and correct description thereof, reference being had to the accompanying drawings, and to the letters of reference marked thereon, in which drawings—

Figure 1 is a perspective view of the machine. Fig. 2 is a representation of the machine open, showing the arrangement of the cutters, &c. Fig. 3 is a cross-section of the machine, taken through in the direction parallel to the plane of its motion. Fig. 4 is a longitudinal section of the shafts, knives, stud-plates, &c. Fig. 5 shows the different sides of the stud-plates. Fig. 6 represents one of the knives.

The same letters denote similar parts in all the figures.

To construct the improved machine, make a case A cylindrical on the inside, but not necessarily so upon the outside, and opening horizontally through its center into two parts, which are hinged together upon one side. At each end of the case A there are made bearings for the shaft B to turn in. These bearings are made part in each division of the case, so that when it is open the shaft, &c., can be readily taken out for the purpose of cleaning or sharpening the knives. The shaft B passes through the center of the case, and has one end projecting out enough to receive a pulley or crank C for the purpose of applying power.

Upon the shaft B there is put a series of plates D, which have projecting from their peripheries one or more studs o or arms to each. These stud-plates D D are all loose upon the shaft, except one of the end ones, which is made fast so as to turn with it and carry the others around by the recesses E and projections F, with which each plate is furnished, the projection on one plate being made to shut into the recess in the next, so as to couple all of them together. These projections F are made somewhat smaller than the recesses, so that each plate may turn a little distance before moving the next. The object of this is to allow each plate to fall a little behind the one that moves it, so that the studs o o o shall form a spiral around the shaft, which will force the meat from one end of the case to the other, and also to admit of the shaft being turned either way and still force the meat toward the same end.

The knives G are made of thin metal and have four cutting-edges on that part of them that the studs pass between. They are placed across the shaft and between the stud-plates D, which keep them in an upright position, so as to present their cutting-edges properly to the material to be cut. To prevent these knives from turning with the shaft and stud-plates, there is a projecting ledge made on the inside or a recess H cut into the side, so that the end of knife may catch upon it. The shape of the knives at their cutting-edges may be convex, straight, or concave, so as to form a more or less acute angle with the studs as they pass by them, thus producing a more or less shearing cut, as may be best adapted to the kind of substance to be cut.

J is the hopper or place for putting in the meat. K at the opposite end is the discharging-aperture. The case is kept shut when in operation by the clasp L, and is intended to be secured to the table, so that the aperture K shall project just over the front edge of it, that the meat may fall clear of the table as it comes out.

The operation is as follows: The meat or other substance to be cut is placed in hopper J and the crank turned, when the studs D D, as fast as the projections F, Fig. 5, between the plates come in contact with the sides of the recesses E, will assume the spiral form and drive the meat around against the knives, and, as it is cut, toward the other end of the case. This spiraling of the studs, together with this arrangement of the knives, has another important effect. As each stud passes down between the knives it presses the knife next to it upon the shaft in the direction of the discharging-aperture against the next stud that is just beginning to enter, so as to produce a close shearing cut between the two, which, in connection with the drawing cut caused by the knives being tapered toward or from their ends, which lets the meat slide outward or inward as it is carried in between the knives, cuts the meat with much more ease than where it is forced by a stud between two knives that are at some distance from it, which is the case in other machines. If the meat should be stringy or tend to clog up the machine, the motion of the shaft can be reversed so as to relieve it, and at the same time the cutting will be going on as before, but upon the opposite edges of the knives.

The effect of the studs upon the edges of the knives that are not being cut upon is to whet or sharpen them, so that when the cutter is used either way it is sharpening the edges that will be used when the motion is reversed, which makes it in a good degree a self-sharpening machine.

One of the principal advantages of having the stud-plates and knives loose is to facilitate the operation of cleansing the machine, which is a great objection to those having stationary knives or studs; but with this arrangement they can all be slipped off into a vessel of warm water and easily cleaned and replaced, and at the same time the case is left all clear, so that it can be readily washed.

Having described my machine, what I claim as my invention, and desire to secure by Letters Patent, is—

1. Placing the knives on or across the shaft and holding them by their ends to prevent them from turning, substantially as described.

2. The manner of constructing the shaft and stud-plates, substantially as and for the purpose herein set forth.

JOHN G. PERRY

Witnesses:
 SODOWICK W. UPDIKE,
 BENJAMIN ARNOLD.